United States Patent
Imazu

(10) Patent No.: US 11,941,988 B2
(45) Date of Patent: *Mar. 26, 2024

(54) PARKING LOT MANAGEMENT DEVICE

(71) Applicant: TOYOTA JIDOSHA KABUSHIKI KAISHA, Toyota (JP)

(72) Inventor: Takanori Imazu, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/080,390

(22) Filed: Dec. 13, 2022

(65) Prior Publication Data

US 2023/0116789 A1 Apr. 13, 2023

Related U.S. Application Data

(63) Continuation of application No. 16/812,774, filed on Mar. 9, 2020, now Pat. No. 11,749,113.

(30) Foreign Application Priority Data

Mar. 19, 2019 (JP) ................................ 2019-050908

(51) Int. Cl.
*G08G 1/16* (2006.01)
*B60W 30/06* (2006.01)
(Continued)

(52) U.S. Cl.
CPC ......... *G08G 1/166* (2013.01); *G01C 21/3461* (2013.01); *G06Q 10/06311* (2013.01);
(Continued)

(58) Field of Classification Search
CPC ........ G08G 1/166; G08G 1/146; G08G 1/164; G08G 1/168; G08G 1/096708;
(Continued)

(56) References Cited

U.S. PATENT DOCUMENTS

2010/0156672 A1* 6/2010 Yoo ..................... B62D 15/0285
340/436
2013/0261952 A1* 10/2013 Aso ................... B60W 30/0953
701/301

(Continued)

FOREIGN PATENT DOCUMENTS

CN    103155014 A    6/2013
CN    103155014 B    4/2015

(Continued)

OTHER PUBLICATIONS

English Translation of JP-5862346-B2 retrieved from Espacenet on Dec. 23, 2022 (Year: 2022).*

(Continued)

*Primary Examiner* — Fadey S. Jabr
*Assistant Examiner* — Faris Asim Shaikh
(74) *Attorney, Agent, or Firm* — Dinsmore & Shohl LLP

(57) ABSTRACT

A parking lot management device configured to manage traveling of vehicles by setting a scheduled passage time for each node indicating a travel route in a parking lot includes: an acquisition unit configured to acquire an actual passage time at which a first vehicle has actually passed a first node; a determination unit configured to determine a collision risk between a second vehicle and the first vehicle based on the actual passage time, the second vehicle being scheduled to pass, following the first vehicle, a second node that is located forward of the first node in a traveling direction of the first vehicle; and a setting unit configured to delay a first scheduled passage time at which the second vehicle passes the second node to cause the second vehicle to pass the second node following the first vehicle when it is determined that there is the collision risk.

18 Claims, 4 Drawing Sheets

(51) Int. Cl.
  *G01C 21/34* (2006.01)
  *G05D 1/00* (2006.01)
  *G05D 1/02* (2020.01)
  *G06Q 10/0631* (2023.01)

(52) U.S. Cl.
  CPC .......... *B60W 30/06* (2013.01); *G05D 1/0088* (2013.01); *G05D 1/0214* (2013.01); *G05D 2201/0213* (2013.01)

(58) Field of Classification Search
  CPC .......... G08G 1/0969; G08G 1/14; G08G 1/16; G01C 21/3461; G06Q 10/06311; G06Q 10/087; B60W 30/06; B60W 30/08; B60W 30/143; B60W 30/165; B60W 50/0098; B60W 2050/0075; B60W 2556/45; G05D 1/0088; G05D 1/0214; G05D 2201/021; G05D 2201/0213; G05D 1/0291; G05D 1/0287; G05D 1/0282; G05D 1/0238; B62D 15/0285; B60T 7/12
  See application file for complete search history.

(56) References Cited

U.S. PATENT DOCUMENTS

| | | | | |
|---|---|---|---|---|
| 2016/0358476 | A1* | 12/2016 | Aso | B60W 30/0953 |
| 2017/0292854 | A1* | 10/2017 | Zhang | G05D 1/0088 |
| 2017/0351267 | A1* | 12/2017 | Mielenz | G06T 7/70 |
| 2018/0194352 | A1* | 7/2018 | Avedisov | B60W 30/143 |
| 2020/0262418 | A1* | 8/2020 | Lin | B60W 30/0956 |
| 2020/0302796 | A1* | 9/2020 | Imazu | G08G 1/146 |

FOREIGN PATENT DOCUMENTS

| | | |
|---|---|---|
| CN | 107808549 A | 3/2018 |
| CN | 107808549 B | 6/2020 |
| EP | 2629167 A1 | 8/2013 |
| JP | 5862346 B2 * | 2/2016 |
| JP | 5862346 B2 | 2/2016 |
| JP | 2017027175 A | 2/2017 |
| JP | 2018111490 A | 7/2018 |
| JP | 2019036058 A * | 3/2019 |
| JP | 2019036058 A | 3/2019 |

OTHER PUBLICATIONS

English Translation of JP-2019036058-A retrieved from Espacenet on Jul. 29, 2022 (Year: 2022).*

Non-Final Office Action dated Jan. 13, 2023 to U.S. Appl. No. 16/812,774, filed Mar. 9, 2020.

Notice of Allowance dated Jun. 8, 2023, Issued to U.S. Appl. No. 16/812,774, filed Mar. 9, 2020.

* cited by examiner

PARKING LOT MANAGEMENT DEVICE

CROSS-REFERENCE TO RELATED APPLICATIONS

This application is a continuation of co-pending U.S. application Ser. No. 16/812,774, filed Mar. 9, 2020, which in turn claims priority to Japanese Patent Application No. 2019-050908 filed on Mar. 19, 2019, which are both incorporated herein by reference in their entirety including the specification, drawings and abstract.

BACKGROUND

1. Technical Field

The disclosure relates to a technical field of parking lot management devices for parking lots mainly for autonomous driving vehicles.

2. Description of Related Art

Such devices often manage traveling of autonomous driving vehicles in a parking lot by giving travel instructions to the autonomous driving vehicles. As a related technique, Japanese Unexamined Patent Application Publication No. 2018-111490 (JP 2018-111490 A) describes a technique that a host vehicle receives by wireless communication a warning about the presence of traffic congestion or a vehicle speed from a downstream vehicle traveling forward of the host vehicle to autonomously take an action for relieving the situation.

SUMMARY

In many cases, parking lot lanes are provided with branching/merging points (for example, intersections of the lanes) at relatively short intervals. In the parking lot, autonomous driving vehicles are traveling according to travel plans determined in advance by a parking lot management device. However, a gap may occur between the actual traveling of the autonomous driving vehicles and the travel plans. Vehicles may enter the branching/merging point from different directions. Therefore, when the gap occurs, the vehicles may collide with each other at the branching/merging point. When the gap occurs, it is conceivable to change the travel plans in order to prevent the vehicles from colliding with each other at the branching/merging point. However, depending on how to change the travel plans, there is a possibility that the autonomous driving vehicles cannot travel efficiently in the parking lot. The technique described in JP 2018-111490 A cannot solve the issue.

The disclosure provides a parking lot management device that can reduce collision between autonomous driving vehicles in a parking lot while causing the autonomous driving vehicles to travel efficiently.

An aspect of the disclosure relates to a parking lot management device configured to manage traveling of a plurality of vehicles by setting a scheduled passage time for each of a plurality of nodes indicating a travel route in a parking lot. The parking lot management device includes: an acquisition unit configured to acquire an actual passage time at which a first vehicle has actually passed a first node, out of the nodes indicating the travel route of the first vehicle; a determination unit configured to determine a collision risk between a second vehicle and the first vehicle based on the actual passage time, the second vehicle being scheduled to pass, following the first vehicle, a second node, out of the nodes, that is located forward of the first node in a traveling direction of the first vehicle; and a setting unit configured to delay a first scheduled passage time at which the second vehicle passes the second node to cause the second vehicle to pass the second node following the first vehicle when it is determined that there is the collision risk.

In the parking lot management device according to the above aspect, the determination unit may be configured to determine that there is the collision risk when the actual passage time is later than a second scheduled passage time set in advance, at which the first vehicle passes the first node.

In the parking lot management device according to the above aspect, the determination unit may be configured to determine that there is the collision risk when the actual passage time is later than the second scheduled passage time by a first predetermined time or more. The first predetermined time may be determined based on a relative positional relationship between the first vehicle and the second vehicle.

In the parking lot management device according to the above aspect, the determination unit may be configured to determine that there is the collision risk when the determination unit predicts, based on the actual passage time, that the first vehicle passes the second node later than a third scheduled passage time set in advance, at which the first vehicle passes the second node.

In the parking lot management device according to the above aspect, the determination unit may be configured to determine that there is the collision risk when the determination unit predicts that the first vehicle passes the second node later than the third scheduled passage time by a second predetermined time or more. The second predetermined time may be determined based on a relative positional relationship between the first vehicle and the second vehicle.

In the parking lot management device according to the above aspect, the determination unit may be configured to determine that there is the collision risk when the determination unit determines, based on the actual passage time, that a difference between a time at which the first vehicle is predicted to pass the second node and the first scheduled passage time is equal to or less than a third predetermined time.

In the parking lot management device according to the above aspect, the setting unit may be configured to delay, when the determination unit determines that there is the collision risk, the first scheduled passage time by delaying a scheduled time at which the second vehicle passes a third node, out of the nodes indicating the travel route of the second vehicle, that is located forward of the second vehicle in the traveling direction and closer to the second vehicle than the second node.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments of an automated valet parking system will be described with reference to the drawings. In the embodiments described below, a control center is taken as an example of a parking lot management device.

First Embodiment

Figure 1:
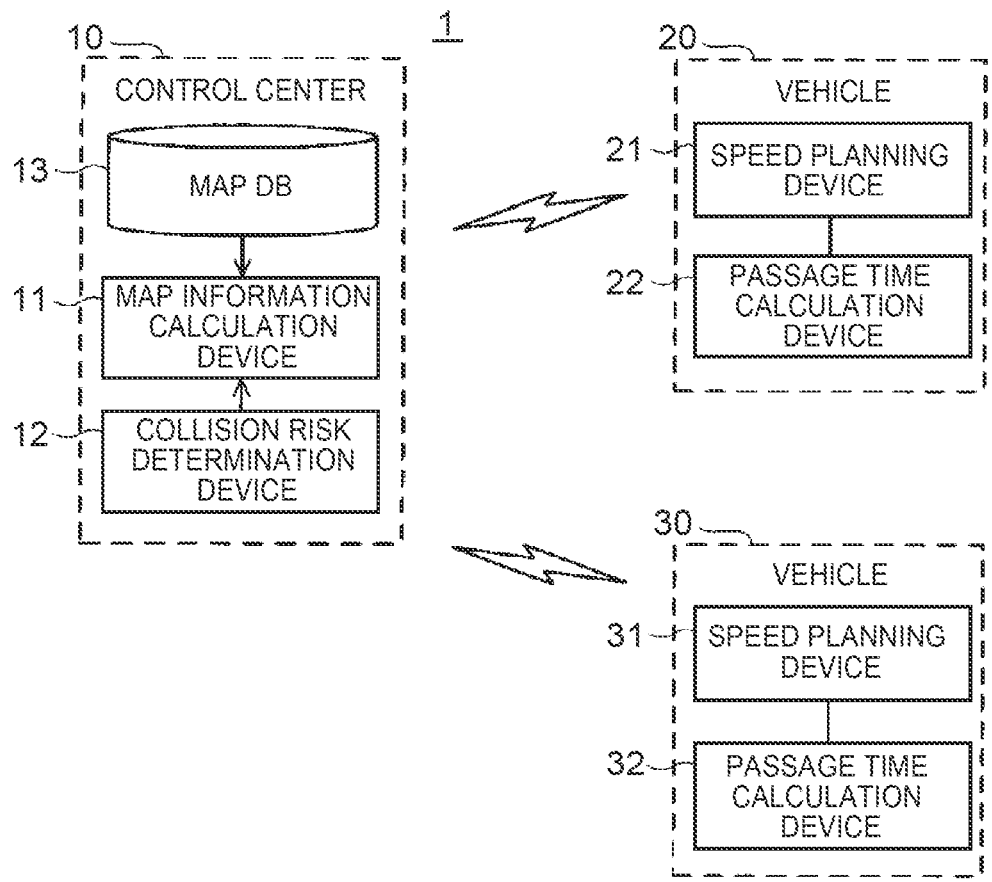
FIG. 1 is a diagram showing a configuration of an automated valet parking system according to a first embodiment.

A first embodiment of the automated valet parking system will be described with reference to FIGS. 1 to 5.
Configuration A configuration of the automated valet parking system according to the first embodiment will be described with reference to FIG. 1. FIG. 1 is a diagram showing the configuration of the automated valet parking system according to the first embodiment.

In FIG. 1, an automated valet parking system 1 includes a control center 10 and a plurality of autonomous driving vehicles (here, autonomous driving vehicles 20 and 30). Hereinafter, the "autonomous driving vehicle" will be referred to as a "vehicle" as appropriate.

The control center 10 manages traveling of each of the vehicles in a parking lot. The control center 10 includes a map information calculation device 11, a collision risk determination device 12, and a map database 13 (hereinafter, referred to as "map DB 13" as appropriate). The map DB 13 stores parking lot map information of the parking lot managed by the control center 10. Here, the parking lot map information will be described with reference to FIG. 2.

Figure 2:
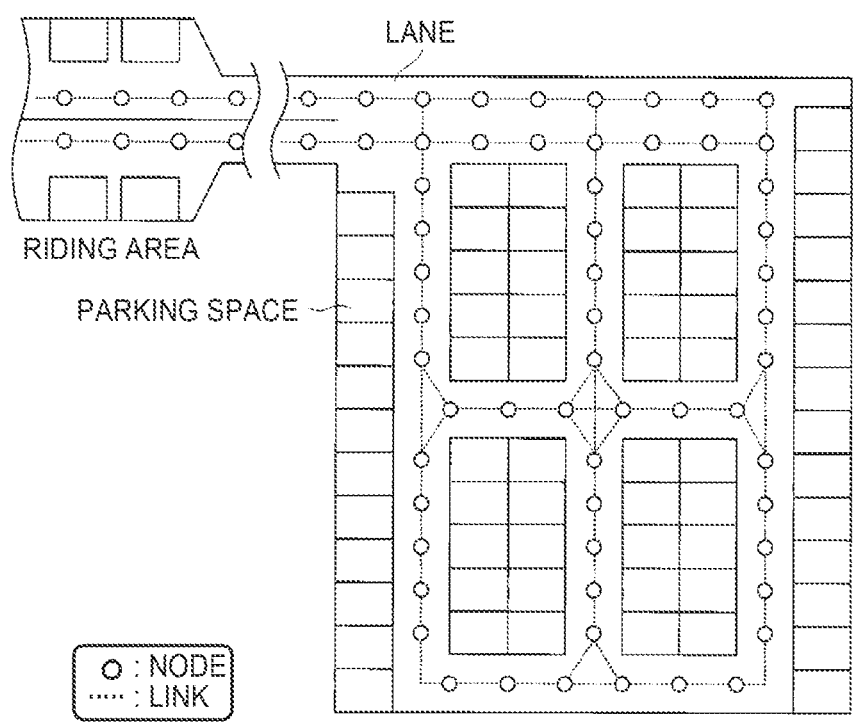
FIG. 2 is a conceptual diagram showing a concept of map information.

FIG. 2 is a conceptual diagram showing a concept of the parking lot map information. In FIG. 2, the shape etc. of the parking lot is clearly shown to help the readers understand. In FIG. 2, white circles represent nodes and dotted lines represent links. Although the nodes are set also for parking spaces, illustration thereof is omitted in order to avoid the drawing from becoming complicated.

In the parking lot map information stored in the map DB 13, the parking lot lanes are represented by combinations of the nodes and the links, as shown in FIG. 2. Each node has position information (latitude, longitude, altitude, etc.). Each link has information indicating a speed limit, information indicating directions in which the vehicles can travel, and the like. Each of the nodes and the links may be assigned with identification information for identification thereof. The "parking lot" of the present embodiment is not limited to an area with a plurality of parking spaces, and represents a concept including a riding area shown in FIG. 2 (i.e., an area where users ride on or get off the autonomous driving vehicles).

As shown in FIG. 1, the map information calculation device 11 calculates a travel route of each vehicle traveling in the parking lot based on the parking lot map information stored in the map DB 13, and generates route map information indicating the calculated travel route. For an entering vehicle that a user wishes to park in the parking lot, the map information calculation device 11 first determines a parking space in which the entering vehicle should be parked based on exit reservation time of the entering vehicle (the exit reservation time is set by the user of the entering vehicle) and information indicating vacant parking spaces. When a difference between the current time and the exit reservation time is small (that is, a parking time is short), the map information calculation device 11 may determine, as the parking space in which the entering vehicle should be parked, a parking space as close to the riding area as possible, compared to a case where the difference is large (that is, the parking time is long).

The map information calculation device 11 then calculates a travel route from the current position of the entering vehicle to the determined parking space. At this time, the map information calculation device 11 sets respective scheduled passage times for the nodes that indicates the travel route and that the entering vehicle is to pass. Here, for example, the scheduled passage time may be set such that, after a scheduled arrival time of the node indicating the parking space determined as described above is set, the entering vehicle arrives at the node indicating the parking space at the set scheduled arrival time, based on the speed limit of each link, information indicating the traveling conditions of other vehicles traveling in the parking lot, and the like.

For an exiting vehicle exiting the parking lot, the map information calculation device 11 first determines a time at which the exiting vehicle starts moving so that the exiting vehicle arrives at the riding area by the exit reservation time, based on the exit reservation time for the exiting vehicle and the position of the parking space in which the exiting vehicle is parked. The map information calculation device 11 then calculates a travel route from the parking space in which the exiting vehicle is parked to the riding area. At this time, the map information calculation device 11 sets respective scheduled passage times for the nodes that indicate the travel route and that the exiting vehicle is to pass. Here, the scheduled passage time may be set such that the exiting vehicle arrives at a node indicating a point that the exiting vehicle is to stop in the riding area by the exit reservation time, based on the determined time at which the exiting vehicle starts moving and the speed limit of each link, the information indicating the traveling conditions of other vehicles traveling in the parking lot, and the like.

Thereafter, the map information calculation device 11 delivers the route map information indicating the calculated travel route to a target vehicle (entering vehicle or exiting vehicle). At this time, the map information calculation device 11 may divide the calculated travel route into a plurality of sections, and deliver the route map information indicating one section of the plurality of sections in accordance with traveling of the target vehicle. With this configuration, time necessary for delivery of the route map information can be reduced, so the time from when the travel route is calculated until the target vehicle starts moving can be shortened.

The collision risk determination device 12 determines a collision risk between vehicles traveling in the parking lot. Specifically, the collision risk determination device 12 determines a collision risk between the target vehicle and a first other vehicle that passes one node, out of the nodes indicating the travel route of the target vehicle, following the target vehicle. The collision risk determination device 12 also determines a collision risk between the target vehicle and a second other vehicle that passes one node, out of the nodes indicating the travel route of the target vehicle, immediately before the target vehicle.

In order to determine the collision risk, the collision risk determination device 12 compares an actual passage time at which the target vehicle has actually passed another node, with a scheduled passage time set in advance, at which the target vehicle passes the other node. The other node is included in the nodes indicating the travel route of the target vehicle and is located more toward a starting point of the travel route than the one node. The collision risk determination device 12 determines that there is a collision risk between the target vehicle and the first other vehicle, when the actual passage time is later than the scheduled passage time. On the other hand, the collision risk determination device 12 determines that there is no collision risk between the target vehicle and the first other vehicle, when the actual passage time is the same as the scheduled passage time or earlier than the scheduled passage time. That is, in the present embodiment, the "collision risk" is represented by a relationship between the actual passage time and the scheduled passage time.

The collision risk determination device 12 determines that there is the collision risk between the target vehicle and the second other vehicle, when the actual passage time is earlier than the scheduled passage time. On the other hand, the collision risk determination device 12 determines that there is no collision risk between the target vehicle and the second other vehicle, when the actual passage time is the same as the scheduled passage time or later than the scheduled passage time.

The vehicle 20 includes a speed planning device 21 and a passage time calculation device 22. Similarly, the vehicle 30 includes a speed planning device 31 and a passage time calculation device 32. Each of the vehicles 20 and 30 includes other components and functions for implementing autonomous driving, although not shown.

Based on the route map information delivered from the map information calculation device 11 of the control center 10, the speed planning devices 21 and 31 plan (calculate) speeds of the vehicles 20 and 30, respectively, traveling along the travel route indicated by the route map information. Here, the route map information delivered to each vehicle 20, 30 includes information regarding the nodes indicating the travel route and information indicating speed limit ranges (or upper speed limits and lower speed limits) set for the links between the nodes of the travel route, for example. The speed planning devices 21 and 31 plan the respective speeds of the vehicles 20 and 30 so that each of the vehicles 20 and 30 travels at a speed within its speed limit range included in the route map information.

The passage time calculation device 22 calculates the passage times at which the vehicle 20 passes the nodes indicating the travel route. The passage time calculation device 32 calculates the passage times at which the vehicle 30 passes the nodes indicating the travel route. For example, each of the passage time calculation devices 22 and 32 may calculate the passage times by acquiring the time at which the vehicle 20 or 30 passes each node, based on the position information indicating the current position of the vehicle 20 or 30. Alternatively, each of the passage time calculation devices 22 and 32 may calculate the passage time of the node closest to the vehicles 20 or 30, out of the nodes present forward of the vehicle 20 or 30 in a traveling direction, based on the position information indicating the current position of the vehicle 20 or 30 and speed information indicating the current speed of the vehicle 20 or 30, for example. Each of the passage time calculation devices 22 and 32 transmits the calculated passage time (corresponding to the above-mentioned "actual passage time") to the control center 10.

Technical Issues

Technical issues that may occur in an automated valet parking system like the automated valet parking system 1 will be described with reference to FIGS. 3, 4A, and 4B.

Vehicles like the vehicles 20 and 30 travel along travel routes indicated by the route map information at speeds respectively planned based on the route map information, as described above. At this time, gap may occur between the time at which the vehicle actually passes one node and the scheduled passage time set in advance for the one node, due to a mechanical response delay, a calculation error, a control error, etc.

Figure 3:
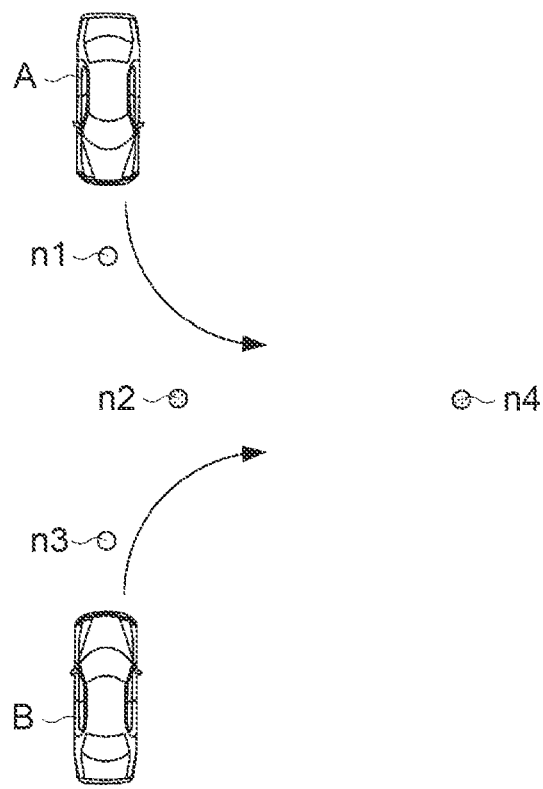
FIG. 3 shows an example of a scene that may occur in the automated valet parking system.

FIG. 3 shows an example of a scene that may occur in the automated valet parking system. FIG. 3 shows a scene in which a vehicle B sequentially passes nodes n3, n2, and n4, after a vehicle A sequentially passes nodes n1, n2, and n4.

At this time, the vehicle A and the vehicle B may collide with each other near the node n2, (a) when the vehicle A passes the node n1 later than the scheduled passage time set in advance for the node n1 or the vehicle A is expected to pass the node n2 later than the scheduled passage time set in advance for the node n2, due to the occurrence of the gap, and/or (b) when the vehicle B passes the node n3 earlier than the scheduled passage time set in advance for the node n3 or the vehicle B is expected to pass the node n2 earlier than the scheduled passage time set in advance for the node n2, due to the occurrence of the gap.

In such a case, in order to avoid a collision between the vehicle A and the vehicle B, it is conceivable to (1) decelerate or stop the vehicle B so that the vehicle B can pass the node n2 later than the vehicle A and the vehicle A can safely pass the nodes n2 and n4, or (2) decelerate or stop the vehicle A so that the vehicle B can pass the node n2 earlier than the vehicle A and the vehicle B can safely pass the nodes n2 and n4. Note that when there is a delay in the vehicle A, for example, increasing an upper limit value of the speed limit range to increase the speed of the vehicle A (that is, accelerating the vehicle A) is difficult in view of safety.

A specific example of the technical issues that may occur at the time of parking the vehicle A and the vehicle B will be described with reference to FIGS. 4A and 4B, when (2) is adopted, out of the above (1) and (2) (that is, changing a passage order of the vehicle A and the vehicle B). FIGS. 4A and 4B each show an example of issues that may occur in the automated valet parking system. In each of FIGS. 4A and 4B, a shaded portion A indicates a parking space in which the vehicle A is to be parked, and a shaded portion B indicates a parking space in which the vehicle B is to be parked.

Figure 4A:
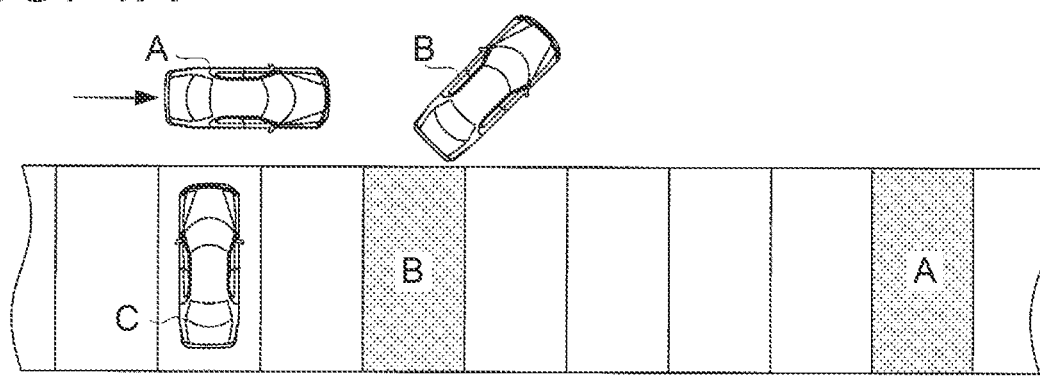
FIG. 4A shows an example of issues that may occur in the automated valet parking system.
Figure 4B:
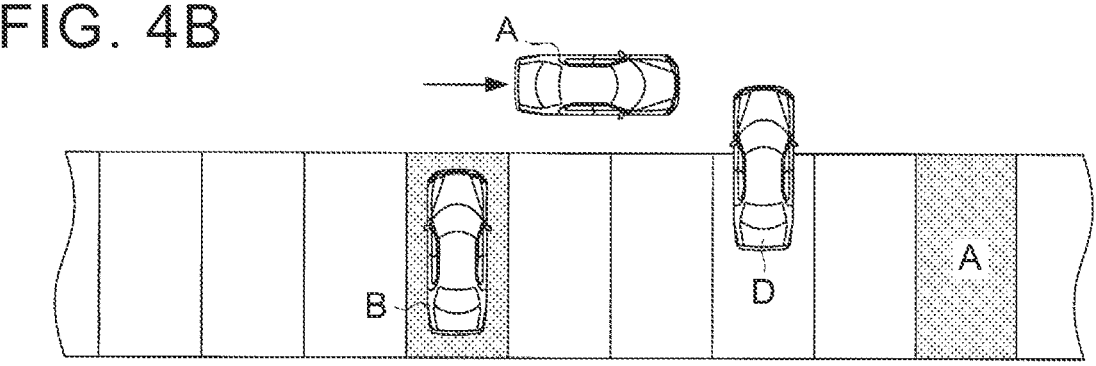
FIG. 4B shows an example of issues that may occur in the automated valet parking system.

As shown in FIG. 4A, when viewed from the vehicle A, the parking space in which the vehicle A is to be parked is located farther than the parking space in which the vehicle B is to be parked. When the original passage order that the vehicle B travels following the vehicle A (that is, the vehicle A is a preceding vehicle and the vehicle B is a following vehicle) is changed to a passage order that the vehicle A travels following the vehicle B, action of parking the vehicle B in the parking space to park may hinder the traveling of the vehicle A (in this case, the vehicle A has to stop). In addition, since the vehicle A is stopped due to the action of parking the vehicle B, the vehicle C may be hindered from exiting. Furthermore, as shown in FIG. 4B, during the action of parking the vehicle B, the vehicle D that has started moving to exit may hinder the traveling of the vehicle A that has restarted traveling after the parking of the vehicle B has been completed.

Alternatively, examples of the technical issues that may occur when the vehicle A and the vehicle B exit the parking lot in the case of (2) include the following. That is, when the vehicle B is originally scheduled to arrive at the riding area (see FIG. 2) following the vehicle A but actually arrives at the riding area before the vehicle A, the vehicle A may have to wait until the vehicle B moves away from the riding area, due to the vehicle B occupying the riding area. This may affect the schedule of the user of the vehicle A and the user of the vehicle A may be dissatisfied.

Thus, when the original passage order is changed in order to avoid a collision between the vehicle A and the vehicle B, it becomes difficult for the vehicles to travel efficiently and the users' convenience may deteriorate.

Therefore, the automated valet parking system 1 employs the above (1) (that is, avoiding collision between vehicles without changing the original passage order). The operations of the automated valet parking system 1 will be specifically described with reference to the flowchart of FIG. 5.

Operations

Figure 5:
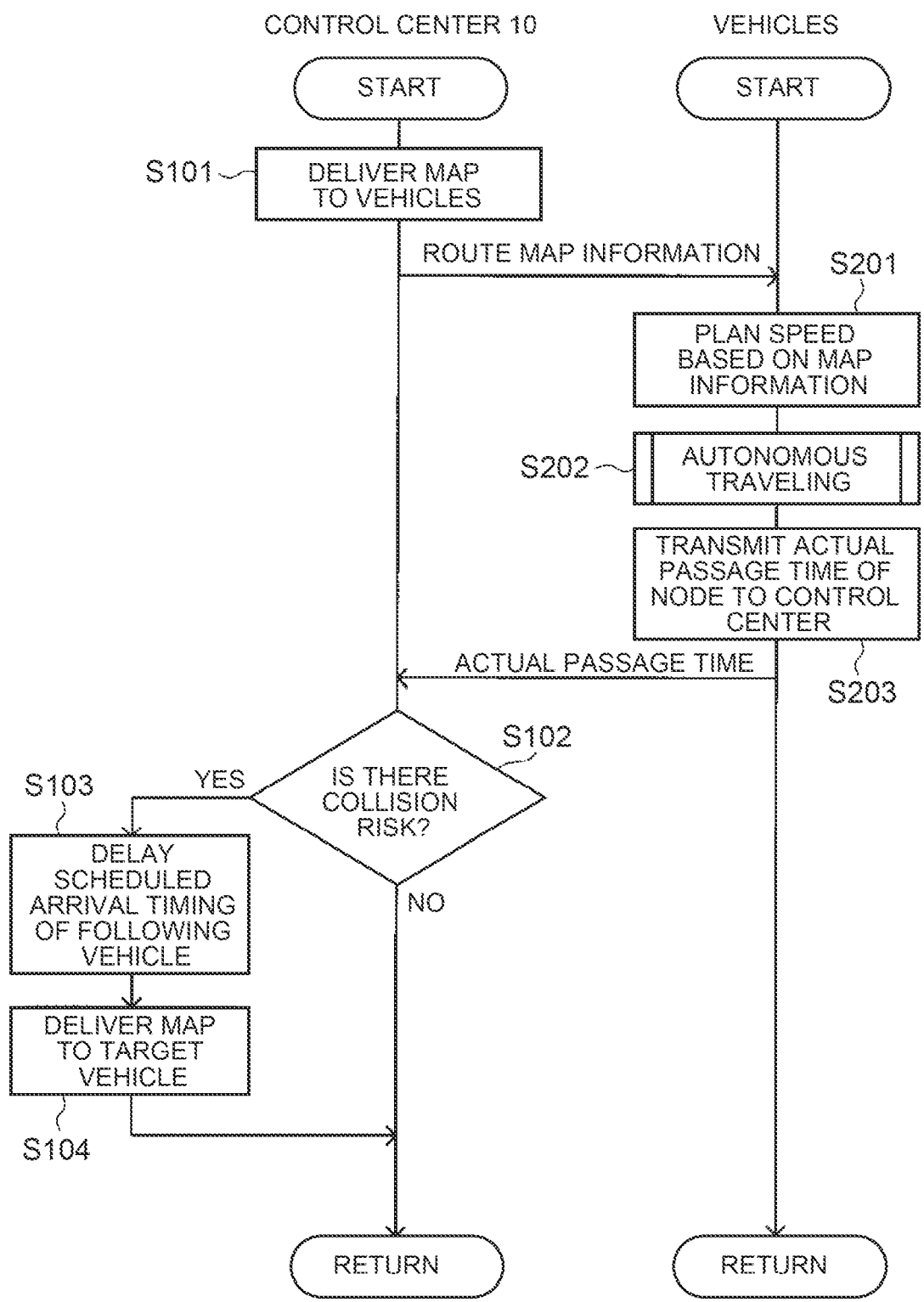
FIG. 5 is a flowchart showing operations of the automatic valet parking system according to the first embodiment.

In FIG. 5, the map information calculation device 11 of the control center 10 delivers, for example, to each of the vehicles 20 and 30, the corresponding route map information (step S101). In each of the vehicles 20 and 30 that have received the route map information, the speed planning device 21 or 31 plans the speed of the vehicle 20 or 30 from the route map information (step S201). Thereafter, each of the vehicles 20 and 30 travels by autonomous driving at the planned speed (step S202). During traveling of the vehicles 20 and 30, the passage time calculation devices 22 and 32 calculate the respective passage times at which the vehicles 20 and 30 pass the nodes, and the calculated passage times (that is, the actual passage times) are transmitted to the control center 10 (step S203).

The collision risk determination device 12 of the control center 10 compares the actual passage time transmitted from each of the vehicles 20 and 30 with the scheduled passage time determined when the travel route of each of the vehicles 20 and 30 is calculated to determine the collision risk between the vehicle 20 and the vehicle 30 (step S102). It is assumed here that the travel route of the vehicle 20 and the travel route of the vehicle 30 overlap at least partially, and the vehicle 30 is scheduled to pass, following the vehicle 20, one node included in an overlapping portion of the travel routes of the vehicle 20 and the vehicle 30. That is, it is assumed here that the vehicle 20 is the preceding vehicle and the vehicle 30 is the following vehicle.

When the actual passage time at which the vehicle 20 has passed another node, out of the nodes indicating the travel route of the vehicle 20, located more toward the starting point of the travel route than the one node is later than the scheduled passage time set in advance, at which the vehicle 20 passes the other node, the collision risk determination device 12 determines that there is a collision risk between the vehicle 20 and the vehicle 30. On the other hand, when the actual passage time at which the vehicle 20 has passed the other node is the same as or earlier than the scheduled passage time set in advance, at which the vehicle 20 passes the other node, the collision risk determination device 12 determines that there is no collision risk between the vehicle 20 and the vehicle 30.

When the actual passage time at which the vehicle 30 has passed another node, out of the nodes indicating the travel route of the vehicle 30, located more toward the starting point of the travel route than the one node is earlier than the scheduled passage time set in advance, at which the vehicle 30 passes the other node, the collision risk determination device 12 determines that there is the collision risk between the vehicle 20 and the vehicle 30. On the other hand, when the actual passage time at which the vehicle 30 has passed the other node is the same as or later than the scheduled passage time set in advance, at which the vehicle 30 passes the other node, the collision risk determination device 12 determines that there is no collision risk between the vehicle 20 and the vehicle 30.

Note that the other node included in the nodes indicating the travel route of the vehicle 20 and the other node included in the nodes indicating the travel route of the vehicle 30 may be identical or different from each other.

When it is determined in the process of step S102 that there is no collision risk (No in step S102), the process of step S101 is performed. When it is determined in the process of step S102 that there is the collision risk (Yes in step S102), the map information calculation device 11 changes the scheduled passage time of the node that the vehicle 30 is to pass, out of the nodes indicating the travel route of the vehicle 30, so that the scheduled passage time at which the vehicle 30 passes the one node is later than originally scheduled, while maintaining the passage order of the vehicles 20 and 30 for the one node (step S103).

At this time, the map information calculation device 11 may directly delay the scheduled passage time of the one node, out of the nodes that the vehicle 30 is to pass, to make the scheduled passage time of the one node later than originally scheduled. Alternatively, the map information calculation device 11 may delay a scheduled passage time of a third node to indirectly make the scheduled passage time of the one node later than originally scheduled, as the delay of the passage time of the third node with respect to the original schedule is transferred to the one node. The third node is a node that is present between the other node included in the nodes indicating the travel route of the vehicle 30 and the one node, and is a node that the vehicle 30 is to pass.

Thereafter, the map information calculation device 11 delivers the route map information incorporating the change made in the process of step S103 to the vehicle 30 (step S104). In the route map information delivered to the vehicle 30 in the process of step S104, typically, the upper limit value of the speed limit range is set smaller than the original upper limit value. When the speed planning device 31 of the vehicle 30 plans the speed of the vehicle 30 based on the route map information, the vehicle 30 is decelerated. As a result, the vehicle 30 travels more slowly, so that the passage time at which the vehicle 30 passes the one node becomes later than originally scheduled. Thereafter, the process of step S101 described above is performed.

Technical Effects

In the automated valet parking system 1, when it is determined that there is a collision risk, due to the gap between the actual passage time and the scheduled passage time, between the preceding vehicle and the following vehicle with their respective travel routes overlapping at least partially, the scheduled passage time of the following vehicle is made later than originally scheduled while the passage order of the vehicles is maintained for the node that both the vehicles pass. Thus, in the automated valet parking system 1, the technical issues described with reference to FIGS. 4A and 4B do not arise. Accordingly, with the automated valet parking system 1, it is possible to reduce the collision between the vehicles while causing the vehicles to travel efficiently in the parking lot. In addition, with the automated valet parking system 1, user convenience can be improved.

First Modification

The collision risk determination device 12 determines the collision risk between the target vehicle and the first other vehicle that passes, following the target vehicle, one node, out of the nodes indicating the travel route of the target vehicle. At this time, the collision risk determination device 12 predicts the passage time at which the target vehicle passes the one node, based on the actual passage time at which the target vehicle has actually passed another node. The other node is included in the nodes indicating the travel route of the target vehicle and is located more toward the starting point of the travel route than the one node. The collision risk determination device 12 may determine that there is the collision risk between the target vehicle and the first other vehicle, when the predicted passage time is later than the scheduled passage time set in advance, at which the target vehicle passes the one node. On the other hand, the collision risk determination device 12 may determine that there is no collision risk between the target vehicle and the first other vehicle, when the predicted passage time is the same as the scheduled passage time or earlier than the scheduled passage time.

The collision risk determination device 12 also determines the collision risk between the target vehicle and the second other vehicle that passes one node, out of the nodes indicating the travel route of the target vehicle, immediately before the target vehicle. At this time, the collision risk determination device 12 predicts the passage time at which the target vehicle passes the one node, based on the actual passage time at which the target vehicle has actually passed another node. The other node is included in the nodes indicating the travel route of the target vehicle and is located more toward the starting point of the travel route than the one node. The collision risk determination device 12 may determine that there is the collision risk between the target vehicle and the second other vehicle, when the predicted passage time is earlier than the scheduled passage time set in advance, at which the target vehicle passes the one node. On the other hand, the collision risk determination device 12 may determine that there is no collision risk between the target vehicle and the second other vehicle, when the predicted passage time is the same as the scheduled passage time or later than the scheduled passage time.

In the process of step S102 described above, the collision risk determination device 12 may determine that there is the collision risk between the vehicle 20 and the vehicle 30, when the passage time at which the vehicle 20 passes the one node is later than the scheduled passage time set in advance, at which the vehicle 20 passes the one node. The passage time at which the vehicle 20 passes the one node is predicted based on the actual passage time at which the vehicle 20 has passed the other node. The other node is included in the nodes indicating the travel route of the vehicle 20 and is located more toward the starting point of the travel route than the one node (that is, the node that the vehicle 30 is scheduled to pass following the vehicle 20). On the other hand, the collision risk determination device 12 may determine that there is no collision risk between the vehicle 20 and the vehicle 30, when the predicted passage time is the same as the scheduled passage time or earlier than the scheduled passage time.

When the passage time at which the vehicle 30 passes the one node is earlier than the scheduled passage time set in advance, at which the vehicle 30 passes the one node, the collision risk determination device 12 may determine that there is the collision risk between the vehicle 20 and the vehicle 30. The passage time at which the vehicle 30 passes the one node is predicted based on the actual passage time at which the vehicle 30 has passed the other node. The other node is included in the nodes indicating the travel route of the vehicle 30 and is located more toward the starting point of the travel route than the one node. On the other hand, the collision risk determination device 12 may determine that there is no collision risk between the vehicle 20 and the vehicle 30, when the predicted passage time is the same as the scheduled passage time or later than the scheduled passage time.

Note that the other node included in the nodes indicating the travel route of the vehicle 20 and the other node included in the nodes indicating the travel route of the vehicle 30 may be identical or different from each other.

Second Modification

The collision risk determination device 12 determines the collision risk between the vehicle 20 and the vehicle 30 that passes, following the vehicle 20, one node, out of the nodes indicating the travel route of the vehicle 20. At this time, the collision risk determination device 12 predicts the passage time at which the vehicle 20 passes the one node, based on the actual passage time at which the vehicle 20 has actually passed the other node. The other node is included in the nodes indicating the travel route of the vehicle 20 and is located more toward the starting point of the travel route than the one node. Thereafter, the collision risk determination device 12 calculates the difference between the passage time at which the vehicle 20 passes the one node (that is, the predicted passage time) and the scheduled passage time set in advance, at which the vehicle 30 passes the one node. In the process of step S102 described above, the collision risk determination device 12 may determine that there is the collision risk between the vehicle 20 and the vehicle 30, when the calculated difference is equal to or less than a predetermined time difference threshold. On the other hand, the collision risk determination device 12 may determine that there is no collision risk between the vehicle 20 and the vehicle 30, when the calculated difference is larger than the predetermined time difference threshold.

Third Modification

The collision risk determination device 12 determines the collision risk between the vehicle 20 and the vehicle 30 that passes, following the vehicle 20, one node out of the nodes indicating the travel route of the vehicle 20. At this time, the collision risk determination device 12 predicts the passage time at which the vehicle 20 passes the one node, based on the actual passage time at which the vehicle 20 has actually passed the other node. The other node is included in the nodes indicating the travel route of the vehicle 20 and is located more toward the starting point of the travel route than the one node. The collision risk determination device 12 further predicts the passage time at which the vehicle 30 passes the one node, based on the actual passage time at which the vehicle 30 has actually passed the other node. The other node is included in the nodes indicating the travel route of the vehicle 30 and is located more toward the starting point of the travel route than the one node. Thereafter, the collision risk determination device 12 calculates a difference between the passage time at which the vehicle 20 passes the one node and the passage time at which the vehicle 30 passes the one node.

In the process of step S102 described above, the collision risk determination device 12 may determine that there is the collision risk between the vehicle 20 and the vehicle 30, when the calculated difference is equal to or less than a predetermined time difference threshold. On the other hand, the collision risk determination device 12 may determine that there is no collision risk between the vehicle 20 and the vehicle 30, when the calculated difference is larger than the predetermined time difference threshold.

Note that the other node included in the nodes indicating the travel route of the vehicle 20 and the other node included in the nodes indicating the travel route of the vehicle 30 may be identical or different from each other.

Second Embodiment

A second embodiment of the automated valet parking system will be described with reference to FIG. 6. The second embodiment is the same as the first embodiment described above except that the operations of the collision risk determination device 12 are partially different. Thus, in the second embodiment, description that is the same as that of the first embodiment is omitted, the common portions in the drawing are denoted by the same reference symbols, and basically, different points will be described with reference to FIG. 6.

Operations

It is assumed that the travel route of the vehicle 20 and the travel route of the vehicle 30 overlap at least partially, and the vehicle 30 is scheduled to pass, following the vehicle 20, one node included in the overlapping portion of the travel routes of the vehicle 20 and the vehicle 30. That is, the vehicle 20 is the preceding vehicle and the vehicle 30 is the following vehicle.

Figure 6:
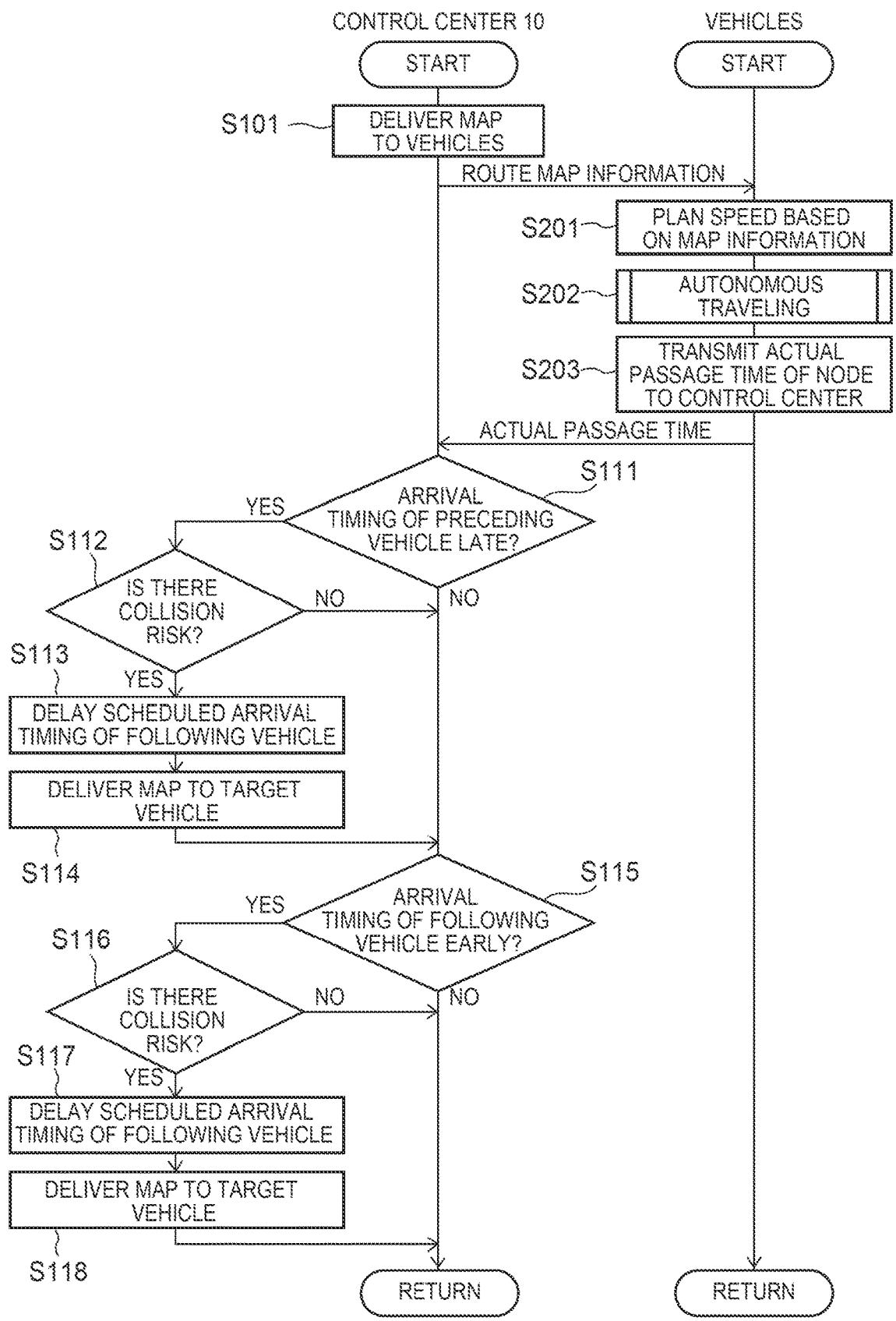
FIG. 6 is a flowchart showing operations of an automatic valet parking system according to a second embodiment.

In FIG. 6, the collision risk determination device 12 of the control center 10 first obtains the actual passage time transmitted from each of the vehicles 20 and 30. Then, the collision risk determination device 12 determines whether the actual passage time at which the vehicle 20 has actually passed the other node is later than the scheduled passage time set in advance, at which the vehicle 20 passes the other node (step S111). The other node is included in the nodes indicating the travel route of the vehicle 20 and is located more toward the starting point of the travel route than the one node.

When it is determined in the process of step S111 that the actual passage time is later than the scheduled passage time (Yes in step S111), the collision risk determination device 12 compares a degree of delay of the actual passage time with respect to the scheduled passage time with a delay threshold, to determine the collision risk between the vehicle 20 and the vehicle 30 (step S112). Here, the delay threshold is a value determined based on the relative positional relationship between the vehicle 20 and the vehicle 30. For example, the delay threshold may be set to be smaller as the distance between the vehicle 20 and the vehicle 30 becomes shorter, in other words, set to be larger as the distance becomes longer.

The collision risk determination device 12 determines that there is the collision risk between the vehicle 20 and the vehicle 30, when the degree of delay is equal to or larger than the delay threshold. On the other hand, the collision risk determination device 12 determines that there is no collision risk between the vehicle 20 and the vehicle 30, when the degree of delay is smaller than the delay threshold.

When it is determined in the process of step S112 that there is the collision risk (Yes in step S112), the map information calculation device 11 changes the scheduled passage time of the node that the vehicle 30 is to pass, out of the nodes indicating the travel route of the vehicle 30, so that the scheduled passage time at which the vehicle 30 passes the one node is later than originally scheduled, while maintaining the passage order of the vehicles 20 and 30 for the one node (step S113). Thereafter, the map information calculation device 11 delivers the route map information incorporating the change made in the process of step S113 to the vehicle 30 (step S114). Note that the processes of steps S113 and S114 are the same as the processes of steps S103 and S104, respectively, according to the first embodiment.

When it is determined in the process of step S111 that the actual passage time is not later than the scheduled passage time (No in step S111), when it is determined in the process of step S112 that there is no collision risk (No in step S112), or after the process of step S114, it is determined whether the actual passage time at which the vehicle 30 has actually passed the other node is earlier than the scheduled passage time set in advance, at which the vehicle 30 passes the other node (step S115). The other node is included in the nodes indicating the travel route of the vehicle 30 and is located more toward the starting point of the travel route than the one node.

When it is determined in the process of step S115 that the actual passage time is earlier than the scheduled passage time (Yes in step S115), the collision risk determination device 12 compares a degree of early arrival of the actual passage time with respect to the scheduled passage time with an early arrival threshold, to determine the collision risk between the vehicle 20 and the vehicle 30 (step S116). Here, the early arrival threshold is a value determined based on the relative positional relationship between the vehicle 20 and the vehicle 30. For example, the early arrival threshold may be set to be smaller as the distance between the vehicle 20 and the vehicle 30 becomes shorter, in other words, set to be larger as the distance becomes longer.

The collision risk determination device 12 determines that there is the collision risk between the vehicle 20 and the vehicle 30, when the degree of early arrival is equal to or larger than the early arrival threshold. On the other hand, the collision risk determination device 12 determines that there is no collision risk between the vehicle 20 and the vehicle 30, when the degree of early arrival is smaller than the early arrival threshold.

When it is determined in the process of step S116 that there is the collision risk (Yes in step S116), the map information calculation device 11 changes the scheduled passage time of the node that the vehicle 30 is to pass, out of the nodes indicating the travel route of the vehicle 30, so that the scheduled passage time at which the vehicle 30 passes the one node is later than originally scheduled, while maintaining the passage order of the vehicles 20 and 30 for the one node (step S117). Thereafter, the map information calculation device 11 delivers the route map information incorporating the change made in the process of step S113 to the vehicle 30 (step S118). Note that the processes of steps S117 and S118 are the same as the processes of steps S103 and S104, respectively, according to the first embodiment.

When it is determined in the process of step S115 that the actual passage time is not earlier than the scheduled passage time (No in step S115), when it is determined in the process of step S116 that there is no collision risk (No in step S116), or after the process of step S118, the process of step S101 is performed.

Note that the other node included in the nodes indicating the travel route of the vehicle 20 and the other node included in the nodes indicating the travel route of the vehicle 30 may be identical or different from each other. The processes of steps S111 to S114 may be performed after the processes of steps S115 to S118.

Modification

In the process of step S111 described above, the collision risk determination device 12 may determine whether the passage time at which the vehicle 20 passes the one node is later than the scheduled passage time set in advance, at which the vehicle 20 passes the one node. The passage time at which the vehicle 20 passes the one node is predicted based on the actual passage time at which the vehicle 20 has passed the other node. The other node is included in the nodes indicating the travel route of the vehicle 20 and is located more toward the starting point of the travel route than the one node (that is, the node that the vehicle 30 is scheduled to pass following the vehicle 20).

When the predicted passage time is later than the scheduled passage time (Yes in step S111), the collision risk determination device 12 may compare the degree of delay of the predicted passage time with respect to the scheduled passage time with the delay threshold, to determine the collision risk between the vehicle 20 and the vehicle 30 (step S112). The collision risk determination device 12 may determine that there is the collision risk between the vehicle 20 and the vehicle 30, when the degree of delay is equal to or larger than the delay threshold. On the other hand, the collision risk determination device 12 may determine that there is no collision risk between the vehicle 20 and the vehicle 30, when the degree of delay is smaller than the delay threshold.

In the process of step S115 described above, the collision risk determination device 12 may determine whether the passage time at which the vehicle 30 passes the one node is earlier than the scheduled passage time set in advance, at which the vehicle 30 passes the one node. The passage time at which the vehicle 30 passes the one node is predicted based on the actual passage time at which the vehicle 30 has passed the other node. The other node is included in the nodes indicating the travel route of the vehicle 30 and is located more toward the starting point of the travel route than the one node.

When the predicted passage time is earlier than the scheduled passage time (Yes in step S115), the collision risk determination device 12 may compare the degree of early arrival of the predicted passage time with respect to the scheduled passage time with the early arrival threshold, to determine the collision risk between the vehicle 20 and the vehicle 30 (step S116). The collision risk determination device 12 may determine that there is the collision risk between the vehicle 20 and the vehicle 30, when the degree of early arrival is equal to or larger than the early arrival threshold. On the other hand, the collision risk determination device 12 may determine that there is no collision risk between the vehicle 20 and the vehicle 30, when the degree of early arrival is smaller than the early arrival threshold.

Note that the other node included in the nodes indicating the travel route of the vehicle 20 and the other node included in the nodes indicating the travel route of the vehicle 30 may be identical or different from each other.

Various modes for carrying out the disclosure, which are derived from the embodiments and modifications described above, will be described below.

A parking lot management device according to one mode of the disclosure is configured to manage traveling of a plurality of vehicles by setting a scheduled passage time for each of a plurality of nodes indicating a travel route in a parking lot. The parking lot management device includes: an acquisition unit configured to acquire an actual passage time at which a first vehicle has actually passed a first node, out of the nodes indicating the travel route of the first vehicle; a determination unit configured to determine a collision risk between a second vehicle and the first vehicle based on the actual passage time, the second vehicle being scheduled to pass, following the first vehicle, a second node, out of the nodes, that is located forward of the first node in a traveling direction of the first vehicle; and a setting unit configured to delay a first scheduled passage time at which the second vehicle passes the second node to cause the second vehicle to pass the second node following the first vehicle when it is determined that there is the collision risk.

In the above embodiments, the "control center 10" can be regarded as an example of the "parking lot management device", the "collision risk determination device 12" can be regarded as an example of the "acquisition unit" and the "determination unit", and the "map information calculation device 11" can be regarded as an example of the "setting unit". In the above embodiments, the "vehicle 20" and the "vehicle A" can be regarded as examples of the "first vehicle", and the "vehicle 30" and the "vehicle B" can be regarded as exampled of the "second vehicle". The "node n1" in FIG. 3 and the "other node included in the nodes indicating the travel route of the vehicle 20" in the description for FIGS. 5 and 6 can be regarded as examples of the "first node". The "node n2" in FIG. 3 and the "one node" in the description for FIGS. 5 and 6 can be regarded as examples of the "second node". The "scheduled passage time at which the vehicle 30 passes the one node" in the description for FIGS. 5 and 6 can be regarded as an example of the "first scheduled passage time".

The parking lot management device manages the traveling of each of the vehicles in the parking lot, based on a map in which the parking lot lanes are expressed by a combination of the nodes and the links. Specifically, for example, the parking lot management device transmits the information indicating the nodes that the target vehicle is to pass (in other words, that indicates the travel route of the target vehicle) as well as passage timings for the nodes, speed limits between the nodes, and the like, to the target vehicle based on the map. The parking lot management device performs the operation on all the vehicles so as to manage the traveling of each of the vehicles in the parking lot. Various existing modes can be applied to the method for determining the nodes that the target vehicle is to pass (in other words, the travel route of the target vehicle), so detailed description thereof will be omitted.

Hereinafter, operations of the parking lot management device that manages the first vehicle and the second vehicle, out of the vehicles, will be described. The travel route of the first vehicle and the travel route of the second vehicle overlap at least partially. The second node is a node included in the overlapping portion of the travel route of the first vehicle and the travel route of the second vehicle. The first node may be a node included only in the travel route of the first vehicle, or may be a node included in the overlapping portion.

Here, the second vehicle is a vehicle that is scheduled to pass the second node following the first vehicle. To "pass following the first vehicle" means that no other vehicle passes the second node during a period after the first vehicle passes the second node until the second vehicle passes the second node.

The acquisition unit acquires an actual passage time at which the first vehicle has actually passed the first node. The acquisition unit may acquire time information indicating the actual passage time from the first vehicle, or may acquire position information from the first vehicle and acquire, as the actual passage time, the time at which the position of the first vehicle indicated by the position information arrives at the first node.

The determination unit determines the collision risk between the first vehicle and the second vehicle based on the actual passage time. How to express the "collision risk" may be appropriately set. The "collision risk" may be expressed, for example, by time, a difference between the scheduled passage time and the actual passage time, a difference between the passage time between the first and second vehicles at the node that both vehicles are to pass, a distance between the first vehicle and the second vehicle, time to collision (TTC), margin to collision (MTC), risk potential, ratio, percentage, and the like.

When it is determined that there is the collision risk, the setting unit delays the first scheduled passage time (that is, the scheduled time at which the second vehicle passes the second node) so that the second vehicle passes the second node following the first vehicle. Here, "the second vehicle passes the second node following the first vehicle" means that the order in which the first vehicle and the second vehicle pass the second node is not changed (as described above, the second vehicle is a vehicle that is scheduled to pass the second node following the first vehicle).

To "delay the first scheduled passage time" is not limited to making the first scheduled passage time itself later than the currently set time. For example, the concept of delaying the first scheduled passage time includes: changing the scheduled passage time at which the second vehicle passes a node that the second vehicle is to pass before passing the second node, so as to make the first scheduled passage time later than the currently set time; decreasing the speed limit for the second vehicle, so as to make the first scheduled passage time later than the currently set time; and the like.

The conditions for "determining that there is the collision risk" may be appropriately set depending on how to express the "collision risk". For example, when the "collision risk" is expressed by the difference between the scheduled passage time and the actual passage time, and the actual passage time (that is, the time at which the first vehicle has actually passed the first node) is later than the scheduled passage time set in advance, at which the first vehicle passes the first node (that is, when the difference obtained by subtracting the scheduled passage time from the actual passage time takes a positive value), it may be determined that there is the collision risk. This is because the first vehicle has passed the first node later than the scheduled passage time, and thus, the first vehicle and the second vehicle become closer to each other than originally scheduled (for example, when the scheduled passage time matches the actual passage time), which increases, to some extent, the possibility that the two vehicles collide.

For example, when the "collision risk" is expressed by the difference between the scheduled passage time and the actual passage time, and the actual passage time is later than the scheduled passage time by a threshold or more (that is, when the difference obtained by subtracting the scheduled passage time from the actual passage time is equal to or larger than the positive threshold), it may be determined that there is the collision risk. This is also because the first vehicle and the second vehicle become closer to each other than originally scheduled (for example, when the scheduled passage time matches the actual passage time), which increases, to some extent, the possibility that the two vehicles collide.

For example, when the "collision risk" is expressed by the difference in the passage time between the first and second vehicles at the node that both vehicles are to pass, and the difference between the passage time at which the first vehicle passes the second node, which is predicted from the actual passage time, and the original first scheduled passage time (that is, the scheduled time at which the second vehicle passes the second node) (that is, the difference in the passage time between the two vehicles) is relatively small, it may be determined that there is the collision risk. This is also because the first vehicle and the second vehicle become closer to each other compared to the case where the difference between the passage time at which the first vehicle passes the second node and the original second scheduled passage time, which is predicted from the actual passage time, is relatively large, which increases, to some extent, the possibility that the two vehicles collide.

In the parking lot, there is a case where a third vehicle is traveling simultaneously with the first vehicle and the second vehicle. In addition, there may a case where a third vehicle starts traveling to exit, for example, while the first vehicle is traveling. Thus, when it is determined that there is the collision risk between the first vehicle and the second vehicle, and the travel plans of the two vehicles are changed only for the purpose of avoiding the collision between the two vehicles, the traveling of at least one of the first vehicle and the second vehicle may be hindered by the third vehicle, or the at least one of the first vehicle and the second vehicle may hinder the traveling of the third vehicle. In particular, when the travel plans of the first and second vehicles are changed such that the second vehicle passes the second node before the first vehicle (that is, such that the traveling order of the first vehicle and the second vehicle is changed), there may be a relatively large influence on the travel plan of the third vehicle.

In the parking lot management device, as described above, when it is determined that there is the collision risk, the first scheduled passage time is delayed so that the second vehicle passes the second node following the first vehicle. That is, the parking lot management device does not make changes in the travel plans that change the traveling order of the first vehicle and the second vehicle. Therefore, with the parking lot management device, it is possible to cause the vehicles to travel with an efficiency equivalent to that expected based on the original travel plan. Therefore, with the parking lot management device, it is possible to reduce the collision between the vehicles in the parking lot while causing the vehicles to travel efficiently.

In one mode of the parking lot management device, the determination unit determines that there is the collision risk, when the acquired actual passage time is later than the second scheduled passage time set in advance, at which the first vehicle passes the first node. In this mode, the "collision risk" is expressed by the relationship between the actual passage time and the scheduled passage time. When the collision risk between the reference vehicle (here, the first vehicle) and the vehicle (here, the second vehicle) that passes a specific node following the reference vehicle is determined, and the actual passage time is later than the scheduled passage time (here, the second scheduled passage time), it is determined that there is the collision risk. On the other hand, when the actual passage time is the same as the scheduled passage time or earlier than the scheduled passage time, it is determined that there is no collision risk. With this configuration, the collision risk can be determined relatively easily, which is beneficial in practice. The "scheduled passage time set in advance, at which the vehicle 20 passes the other node (included in the nodes indicating the travel route of the vehicle 20)" in the description for FIGS. 5 and 6 can be regarded as an example of the "second scheduled passage time".

In this mode, the determination unit may determine that there is the collision risk, when the acquired actual passage time is later than the second scheduled passage time by a first predetermined time or more. The first determined is determined based on the relative positional relationship between the first vehicle and the second vehicle. With this configuration, the reliability regarding determination of the collision risk can be improved. The "first predetermined time" is a value that determines whether there is the collision risk, and is a value that is determined based on the relative positional relationship between the first vehicle and the second vehicle. The "first predetermined time" may be set to be smaller, for example, as the distance between the first vehicle and the second vehicle becomes shorter, in other words, set to be larger as the distance becomes longer.

Alternatively, in another mode of the parking lot management device, the determination unit determines that there is the collision risk, when it is expected, based on the acquired actual passage time, that the first vehicle passes the second node later than a third scheduled passage time set in advance, at which the first vehicle passes the second node. The "scheduled passage time set in advance, at which the target vehicle passes the one node" in the first modification described above can be regarded as an example of the "third scheduled passage time".

In this mode, the "collision risk" is expressed by the relationship between the predicted passage time and the scheduled passage time. When the collision risk between the reference vehicle (here, the first vehicle) and the vehicle (here, second vehicle) that passes a specific node following the reference vehicle is determined, and the predicted passage time is later than the scheduled passage time (here, the third scheduled passage time), it is determined that there is the collision risk. On the other hand, when the predicted passage time is the same as the scheduled passage time or earlier than the scheduled passage time, it is determined that there is no collision risk. With this configuration, the collision risk can be determined relatively easily, which is beneficial in practice.

In this mode, the determination unit may determine that there is the collision risk, when it is predicted that the first vehicle passes the second node later than the third scheduled passage time by a second predetermined time determined based on the relative positional relationship between the first vehicle and the second vehicle. With this configuration, the reliability regarding determination of the collision risk can be improved. The "second predetermined time" is a value that determines whether there is the collision risk, and is a value that is determined based on the relative positional relationship between the first vehicle and the second vehicle. The "second predetermined time" may be set to be smaller as the distance between the first vehicle and the second vehicle becomes shorter, in other words, set to be larger as the distance becomes longer.

Alternatively, in another mode of the parking lot management device, the determination unit determines that there is the collision risk, when the difference between the first scheduled passage time and the time at which the first vehicle is predicted to pass the second node, based on the acquired actual passage time, is equal to or smaller than the third predetermined time.

In this mode, the "collision risk" between the first vehicle and second vehicle is expressed by the difference in the passage time between the two vehicles at the node that both vehicles pass. It is determined that there is the collision risk, when the difference in the passage time between the first and second vehicles at the node that both vehicles are to pass (here, the second node) is equal to or larger the third predetermined time. On the other hand, when the difference in the passage time is smaller than the third predetermined time, it is determined that there is no collision risk.

The "third predetermined time" is a value that determines whether there is the collision risk, and is set as a fixed value or a variable value in accordance with some physical quantity or parameter. Regarding the third predetermined time, a relationship may be obtained experimentally, empirically, or by simulation, between: the difference in the passage time between the first and second vehicles traveling at a typical speed in the parking lot, at the node that both vehicles are to pass; and the distance between the first vehicle and the second vehicle. The third predetermined time may be set as the difference in the passage time such that the distance has a lower limit value of the allowable range, based on the obtained relationship.

In another mode of the parking lot management device, when it is determined that there is the collision risk, the setting unit delays the first scheduled passage time by delaying the scheduled passage time at which the second vehicle passes the third node. The third node is included in the nodes indicating the travel route of the second vehicle and is located forward of the second vehicle in its traveling direction and more toward the second vehicle than the second node. In this mode, the first scheduled passage time can be delayed relatively easily.

The disclosure is not limited to the embodiments described above, and various modifications can be made without contradiction with the scope of the disclosure which can be read from the claims and the specification as a whole. The parking lot management device involving such modifications is also included in the technical scope of the disclosure.

What is claimed is:

1. An automated valet parking system to manage traveling of a plurality of vehicles by setting a scheduled passage of time for each of a plurality of nodes indicating a travel route in a parking lot, the system comprising:
    a parking lot management device in wireless communication with the plurality of vehicles, the parking lot management device configured to:
    calculate a travel route of each vehicle traveling in the parking lot based on a parking lot map information, the parking lot map information includes a plurality of parking lot lanes, the plurality of parking lot lanes are represented by combinations of the plurality of nodes and a plurality of links, each link of the plurality of links has information indicating a speed limit and the scheduled passage of time of each node of the plurality of nodes is set based on the speed limit of each link;
    deliver route map information indicating the calculated travel route to a first autonomous driving vehicle and a second autonomous driving vehicle, the route map information includes the scheduled passage of time, which is the time when the second autonomous driving vehicle is scheduled to pass through a first node, a second node, or a third node, out of the plurality of nodes indicating the travel route;
    acquire an actual passage time at which the second autonomous driving vehicle has actually passed the third node, out of the plurality of nodes indicating the travel route of the second autonomous driving vehicle;

determine a collision risk between the second autonomous driving vehicle and the first autonomous driving vehicle by comparing the actual passage time of the second autonomous driving vehicle with the scheduled passage of time of the second autonomous driving vehicle, and the first autonomous driving vehicle is scheduled to pass the second node before the second autonomous driving vehicle is scheduled to pass the second node in a predetermined passage order, wherein
the first autonomous driving vehicle and the second autonomous driving vehicle are each scheduled to pass the second node, out of the plurality of nodes that is located forward of the third node in a traveling direction of the second autonomous driving vehicle, delay a first scheduled passage time at which the second autonomous driving vehicle is scheduled to pass the second node and deliver the delayed first scheduled passage time to the second autonomous driving vehicle to cause the second autonomous driving vehicle to pass the second node following the first autonomous driving vehicle when it is determined that there is the collision risk and to maintain the predetermined passage order; and manage the traveling of the first autonomous driving vehicle and the second autonomous driving vehicle based on the parking lot map information, the route map information, and the actual passage time of the first autonomous driving vehicle and the second autonomous driving vehicle, wherein the route map information is calculated so that the second autonomous driving vehicle is scheduled to pass the second node after the first autonomous driving vehicle is scheduled to pass the second node.

2. The system according to claim 1, wherein the parking lot management device is further configured to:
determine that there is the collision risk when the actual passage time is later than a second scheduled passage time set in advance at which the first autonomous driving vehicle passes the first node.

3. The system according to claim 2, wherein the parking lot management device is further configured to:
determine that there is the collision risk when the actual passage time is later than the second scheduled passage time by a first predetermined time or more, the first predetermined time being determined based on a relative positional relationship between the first autonomous driving vehicle and the second autonomous driving vehicle.

4. The system according to claim 1, wherein the parking lot management device is further configured to:
determine that there is the collision risk when a prediction, based on the actual passage time, that the first autonomous driving vehicle passes the second node later than a third scheduled passage time set in advance at which the first autonomous driving vehicle passes the second node.

5. The system according to claim 4, wherein the parking lot management device is further configured to:
determine that there is the collision risk when the prediction that the first autonomous driving vehicle passes the second node later than the third scheduled passage time by a second predetermined time or more, the second predetermined time being determined based on a relative positional relationship between the first autonomous driving vehicle and the second autonomous driving vehicle.

6. The system according to claim 1, wherein the parking lot management device is further configured to:
determine that there is the collision risk based on the actual passage time, that a difference between a time at which the first autonomous driving vehicle is predicted to pass the second node and the first scheduled passage time is equal to or less than a third predetermined time.

7. The system according to claim 1, wherein the parking lot management device is further configured to:
determine that there is the collision risk, delay the first scheduled passage time by delaying a scheduled time at which the second autonomous driving vehicle passes the third node, out of the plurality of nodes indicating the travel route of the second autonomous driving vehicle, that is located forward of the second autonomous driving vehicle in the traveling direction and closer to the second autonomous driving vehicle than the second node.

8. The system according to claim 1, wherein the parking lot management device is further configured to:
determine the first autonomous driving vehicle as a preceding vehicle of the second autonomous driving vehicle in dependence on the scheduled passage times determined when the travel routes of the first autonomous driving vehicle and the second autonomous driving vehicle are calculated.

9. The system according to claim 1, wherein the route map information is generated based on exit reservation time and parking space of the first autonomous driving vehicle and the second autonomous driving vehicle.

10. A method to manage traveling of a plurality of vehicles by setting a scheduled passage of time for each of a plurality of nodes indicating a travel route in a parking lot, the method comprising:
calculating a travel route of each vehicle traveling in the parking lot based on a parking lot map information, the parking lot map information includes a plurality of parking lot lanes, the plurality of parking lot lanes are represented by combinations of the plurality of nodes and a plurality of links, each link of the plurality of links has information indicating a speed limit and the scheduled passage of time of each node of the plurality of nodes is set based on the speed limit of each link;

delivering route map information indicating the calculated travel route to a first autonomous driving vehicle and a second autonomous driving vehicle, the route map information includes the scheduled passage of time, which is the time when the second autonomous driving vehicle is scheduled to pass through a first node, a second node, or a third node, out of the plurality of nodes indicating the travel route;

acquiring an actual passage time at which the second autonomous driving vehicle has actually passed the third node, out of the plurality of nodes indicating the travel route of the second autonomous driving vehicle;

determining a collision risk between the second autonomous driving vehicle and the first autonomous driving vehicle by comparing the actual passage time of the second autonomous driving vehicle with the scheduled passage of time of the second autonomous driving vehicle, wherein the first autonomous driving vehicle and the second autonomous driving vehicle are each scheduled to pass the second node, out of the plurality of nodes that is located forward of the first node in a traveling direction of the first autonomous driving vehicle, and wherein the first autonomous driving vehicle is scheduled to pass the second node before the second autonomous driving vehicle is scheduled to pass the second node in a predetermined passage order;

delaying a first scheduled passage time at which the second autonomous driving vehicle is scheduled to pass the second node and deliver the delayed first scheduled passage time to the second autonomous driving vehicle to cause the second autonomous driving vehicle to pass the second node following the first autonomous driving vehicle when it is determined that there is the collision risk and to maintain the predetermined passage order; and managing the traveling of the first autonomous driving vehicle and the second autonomous driving vehicle based on the parking lot map information, the route map information, and the actual passage time of the first autonomous driving vehicle and the second autonomous driving vehicle, wherein the route map information is calculated so that the second autonomous driving vehicle is scheduled to pass the second node after the first autonomous driving vehicle is scheduled to pass the second node.

11. The method according to claim 10, further comprising:

determining that there is the collision risk when the actual passage time is later than a second scheduled passage time set in advance at which the first autonomous driving vehicle passes the first node.

12. The method according to claim 10, further comprising:

determining that there is the collision risk when the actual passage time is later than the second scheduled passage time by a first predetermined time or more, the first predetermined time being determined based on a relative positional relationship between the first autonomous driving vehicle and the second autonomous driving vehicle.

13. The method according to claim 10, further comprising:

determining that there is the collision risk when a prediction, based on the actual passage time, that the first autonomous driving vehicle passes the second node later than a third scheduled passage time set in advance at which the first autonomous driving vehicle passes the second node.

14. The method according to claim 13, further comprising:

determining that there is the collision risk when the prediction that the first autonomous driving vehicle passes the second node later than the third scheduled passage time by a second predetermined time or more, the second predetermined time being determined based on a relative positional relationship between the first autonomous driving vehicle and the second autonomous driving vehicle.

15. The method according to claim 10, further comprising:

determining that there is the collision risk based on the actual passage time, that a difference between a time at which the first autonomous driving vehicle is predicted to pass the second node and the first scheduled passage time is equal to or less than a third predetermined time.

16. The method according to claim 10, further comprising:

determining that there is the collision risk, delay the first scheduled passage time by delaying a scheduled time at which the second autonomous driving vehicle passes the third node, out of the plurality of nodes indicating the travel route of the second autonomous driving vehicle, that is located forward of the second autonomous driving vehicle in the traveling direction and closer to the second autonomous driving vehicle than the second node.

17. The method according to claim 10, further comprising:

determining the first autonomous driving vehicle as a preceding vehicle of the second autonomous driving vehicle in dependence on the scheduled passage times determined when the travel routes of the first autonomous driving vehicle and the second autonomous driving vehicle are calculated.

18. The method according to claim 10, wherein the route map information is generated based on exit reservation time and parking space of the first autonomous driving vehicle and the second autonomous driving vehicle.

* * * * *